United States Patent
Chen et al.

(10) Patent No.: US 9,826,088 B2
(45) Date of Patent: Nov. 21, 2017

(54) METHOD AND DEVICE FOR MARKING AN UNRECOGNIZED NUMBER

(71) Applicant: XIAOMI INC., Beijing (CN)

(72) Inventors: Zhijun Chen, Beijing (CN); Fei Long, Beijing (CN); Tao Zhang, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 15/209,959

(22) Filed: Jul. 14, 2016

(65) Prior Publication Data
US 2017/0034345 A1    Feb. 2, 2017

(30) Foreign Application Priority Data
Jul. 28, 2015    (CN) .......................... 2015 1 0450915

(51) Int. Cl.
*H04W 4/16*    (2009.01)
*H04M 3/42*    (2006.01)
(Continued)

(52) U.S. Cl.
CPC ........ *H04M 3/42068* (2013.01); *G06Q 10/00* (2013.01); *H04L 67/306* (2013.01); *H04W 4/16* (2013.01); *G06Q 50/01* (2013.01)

(58) Field of Classification Search
CPC .... H04M 3/42068; H04M 1/725; H04M 3/42; H04L 67/306; H04L 29/08; G06Q 10/00; G06Q 50/01; G06Q 50/00; H04W 4/16
See application file for complete search history.

(56) References Cited

U.S. PATENT DOCUMENTS 9,003,505 B2 *   4/2015   Brown ............... G06Q 50/01
                                               709/227
2009/0086720 A1   4/2009   Westlake
(Continued)

FOREIGN PATENT DOCUMENTS

CN    102685751 A    9/2012
CN    102970667 A    3/2013
(Continued)

OTHER PUBLICATIONS

Extended European Search Report dated Oct. 27, 2016 for European Application No. 16176963.3, 8 pages.
(Continued)

*Primary Examiner* — Chuong A Ngo
(74) *Attorney, Agent, or Firm* — Brinks, Gilson & Lione

(57) ABSTRACT

Described are method and devices for marking an unrecognized number. A method may include receiving an information acquisition request sent from a terminal when a first phone number of a correspondent node communicating with the terminal is detected to be an unrecognized number. The method may further include identifying a first social account corresponding to the first phone number by querying a preset corresponding relationship between at least one phone number and at least one social account. The method may further include detecting whether the first social account is a friend account of a second social account corresponding to a second phone number of the terminal. The method may further include, when the first social account is detected to be a friend account of the second social account, obtaining account information, and sending the account information to the terminal to mark the unrecognized number.

15 Claims, 7 Drawing Sheets

(51) Int. Cl.
*H04L 29/08* (2006.01)
*G06Q 10/00* (2012.01)
*G06Q 50/00* (2012.01)

(56) References Cited

U.S. PATENT DOCUMENTS

| | | | |
|---|---|---|---|
| 2011/0201320 A1 | 8/2011 | Wosk et al. | |
| 2011/0294478 A1 | 12/2011 | Trivi et al. | |
| 2012/0214456 A1 | 8/2012 | Cho et al. | |
| 2014/0128047 A1 | 5/2014 | Edwards et al. | |
| 2015/0140977 A1 | 5/2015 | Zhang et al. | |
| 2016/0006868 A1* | 1/2016 | Zhang | H04M 1/274516 455/415 |
| 2016/0180324 A1* | 6/2016 | Shenoy | G06Q 20/10 705/39 |

FOREIGN PATENT DOCUMENTS

| | | |
|---|---|---|
| CN | 103179245 A | 6/2013 |
| CN | 103561151 A | 2/2014 |
| CN | 104168560 A | 11/2014 |
| CN | 104349324 A | 2/2015 |
| CN | 104540114 A | 4/2015 |
| CN | 105141789 A | 12/2015 |
| JP | 2008-219797 A | 9/2008 |
| JP | 2013-519297 A | 5/2013 |
| JP | 2013-126124 A | 6/2013 |
| JP | 2014-510446 A | 4/2014 |
| KR | 10-2014-0019329 A | 2/2014 |
| KR | 10-2014-0073073 A | 6/2014 |

OTHER PUBLICATIONS

English Translation of International Search Report dated Apr. 19, 2016 for International Application No. PCT/CN2015/099962, 2 pages.
Written Opinion dated Apr. 19, 2016 for International Application No. PCT/CN2015/099962, 5 pages.
Office Action dated Jul. 25, 2017 for Chinese Application No. 201510450915.7, 14 pages.
Office Action dated Oct. 17, 2017 for Japanese Application No. 2016-554869, 7 pages.

* cited by examiner

METHOD AND DEVICE FOR MARKING AN UNRECOGNIZED NUMBER

CROSS-REFERENCE TO RELATED APPLICATIONS

This application is based upon and claims priority to Chinese Patent Application No. 201510450915.7, filed on Jul. 28, 2015, the entire contents of which are incorporated herein by reference.

TECHNICAL FIELD

Embodiments of the present disclosure relate to the technical field of communications, and more particularly, to methods and devices for marking an unrecognized number, such as an unrecognized phone number.

BACKGROUND

A user may receive a call or other communication from an unrecognized number when using a terminal. Methods and devices are needed to provide the user with information about the unrecognized number, so as to prevent the user from missing a call from a friend by deciding not to answer the call out of concerns of receiving a fraudulent call, a sales call, or the like.

SUMMARY

According to a first aspect of an embodiment of the present disclosure, a method for marking an unrecognized phone number is provided. A method may include receiving, with a server, an information acquisition request sent from a terminal when a first phone number of a correspondent node communicating with the terminal is detected to be an unrecognized number, the information acquisition request including the first phone number. The method may further include identifying, with a server, at least one pre-existing first social account corresponding to the first phone number by querying a preset corresponding relationship between at least one phone number and at least one social account. The method may further include detecting, with a server, whether the at least one pre-existing first social account is a friend account of at least one pre-existing second social account corresponding to a second phone number of the terminal. The method may further include, when the at least one pre-existing first social account is detected to be a friend account of the at least one pre-existing second social account, obtaining, with a server, account information of the at least one pre-existing first social account, and sending, with a server, the account information to the terminal, wherein the account information is used for marking the unrecognized number.

According to a second aspect of an embodiment of the present disclosure, a device for marking an unrecognized phone number is provided. A device may include a processor and a memory configured to store processor executable instructions. The processor may be configured to receive an information acquisition request sent from a terminal when a first phone number of a correspondent node communicating with the terminal is detected to be an unrecognized number, the information acquisition request including the first phone number. The processor may be further configured to identify at least one pre-existing first social account corresponding to the first phone number by querying a preset corresponding relationship between at least one phone number and at least one social account. The processor may be further configured to detect whether the at least one pre-existing first social account is a friend account of at least one pre-existing second social account corresponding to a second phone number of the terminal. The processor may be further configured to, when the at least one pre-existing first social account is detected to be a friend account of the at least one pre-existing second social account, obtain account information of the at least one pre-existing first social account, and send the account information to the terminal, wherein the account information is to be used for marking the unrecognized number According to a third aspect of an embodiment of the present disclosure, a non-transitory computer-readable storage medium having stored therein instructions for marking an unrecognized phone number. The instructions may be configured to, when executed by a processor of a server, cause the server to receive an information acquisition request sent from a terminal when a first phone number of a correspondent node communicating with the terminal is detected to be an unrecognized number, the information acquisition request including the first phone number. The instructions may be further configured to cause the server to identify at least one pre-existing first social account corresponding to the first phone number by querying a preset corresponding relationship between at least one phone number and at least one social account. The instructions may be further configured to cause the server to detect whether the at least one pre-existing first social account is a friend account of at least one pre-existing second social account corresponding to a second phone number of the terminal. The instructions may be further configured to cause the server to, when the at least one pre-existing first social account is detected to be a friend account of the at least one pre-existing second social account, obtain account information of the at least one pre-existing first social account, and send the account information to the terminal, wherein the account information is to be used for marking the unrecognized number.

It is to be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings, in which the same numbers in different drawings represent the same or similar elements unless otherwise noted. The implementations set forth in the following description of exemplary embodiments do not represent all implementations consistent with the disclosure. Instead, they are merely examples of apparatuses and methods consistent with aspects related to the disclosure and the appended claims.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

The terminology used in the description of the disclosure herein is for the purpose of describing particular examples only and is not intended to be limiting of the disclosure. As used in the description of the disclosure and the appended claims, the singular forms "a," "an," and "the" are intended to include the plural forms as well, unless the context clearly indicates otherwise. Also, as used in the description herein and throughout the claims that follow, the meaning of "in" includes "in" and "on" unless the context clearly dictates otherwise. It will also be understood that the term "and/or" as used herein refers to and encompasses any and all possible combinations of one or more of the associated listed items. It will be further understood that the terms "may include," "including," "comprises," and/or "comprising," when used in this specification, specify the presence of stated features, operations, elements, and/or components, but do not preclude the presence or addition of one or more other features, operations, elements, components, and/or groups thereof.

Figure 1:
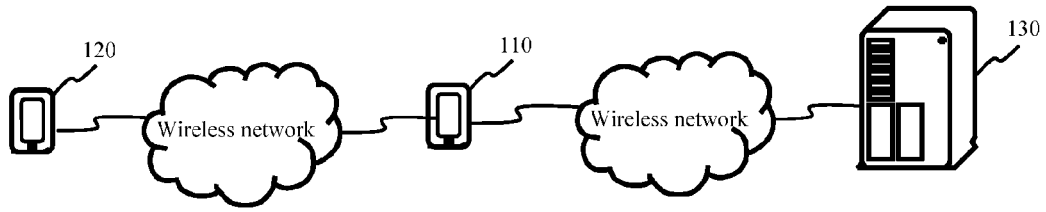
FIG. 1 is a schematic diagram illustrating an implementation environment related to a method for marking an unrecognized number, according exemplary embodiments.

FIG. 1 is a schematic diagram illustrating an implementation environment related to a method for marking an unrecognized number, according exemplary embodiments. As shown in FIG. 1, the implementation environment may include a terminal 110, a correspondent node 120, and a server 130.

The terminal 110 and the correspondent node 120 may be two terminals communicating with each other. For example, the terminal 110 and the correspondent node 120 may each be a mobile phone. The terminal 110 can connect with the server 130 through a wireless network.

The server 130 may be one or more than one server, or a cloud computing center. In other words, the server 130 may be implemented as one server or a combination of a plurality of servers, or as a virtual computing platform formed by a cluster of servers or services.

Figure 2:
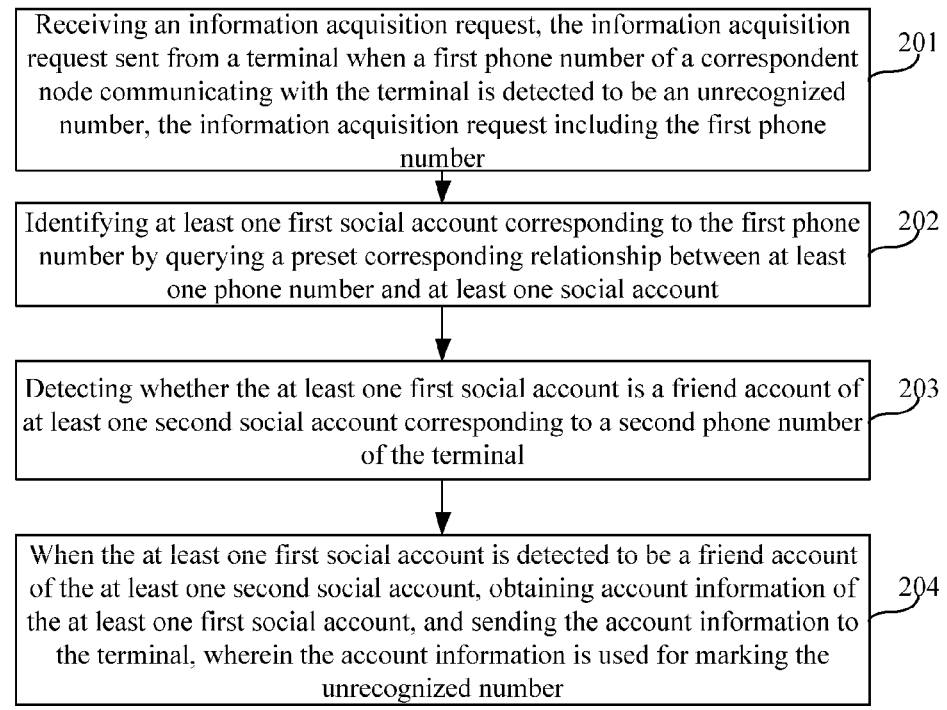
FIG. 2 is a flow chart showing a method for marking an unrecognized number, according to an exemplary embodiment.

FIG. 2 is a flow chart showing a method for marking an unrecognized number, according to an exemplary embodiment. An exemplary present embodiment is illustrated by applying, with server 130, in the implementation environment shown in FIG. 1, a method for marking an unrecognized number. As shown in FIG. 2, a method for marking an unrecognized number may include the following steps 201-204.

In step 201, an information acquisition request is received, the information acquisition request sent from a terminal when a first phone number of a correspondent node communicating with the terminal is detected to be an unrecognized number, the information acquisition request including the first phone number.

In step 202, at least one first social account corresponding to the first phone number is identified by querying a preset corresponding relationship between at least one phone number and at least one social account.

In step 203, whether the at least one first social account is a friend account of at least one second social account corresponding to a second phone number of the terminal is detected.

In step 204, when the at least one first social account is detected to be a friend account of the at least one second social account, account information of the at least one first social account is obtained and sent to the terminal, wherein the account information is used for marking the unrecognized number.

In summary, according to a method for marking an unrecognized number according to the present disclosure, when the terminal communicates with a correspondent node whose phone number is an unrecognized number, the first social account corresponding to the first phone number of the correspondent node is identified. When the first social account is detected to be a friend account of the second social account corresponding to the second phone number of the terminal, the account information of the first social account is sent to the terminal, and then the terminal uses the account information to mark the unrecognized number. Thus the present disclosure may solve a problem in the related art that when a terminal marks an unrecognized number as being in the category of an unrecognized number, the user will be unable to determine which friend's number the unrecognized number is. The present disclosure may achieve the effect that the user can determine which friend the number belongs to through the account information of the first social account that corresponds to the unrecognized number.

Figure 3A:
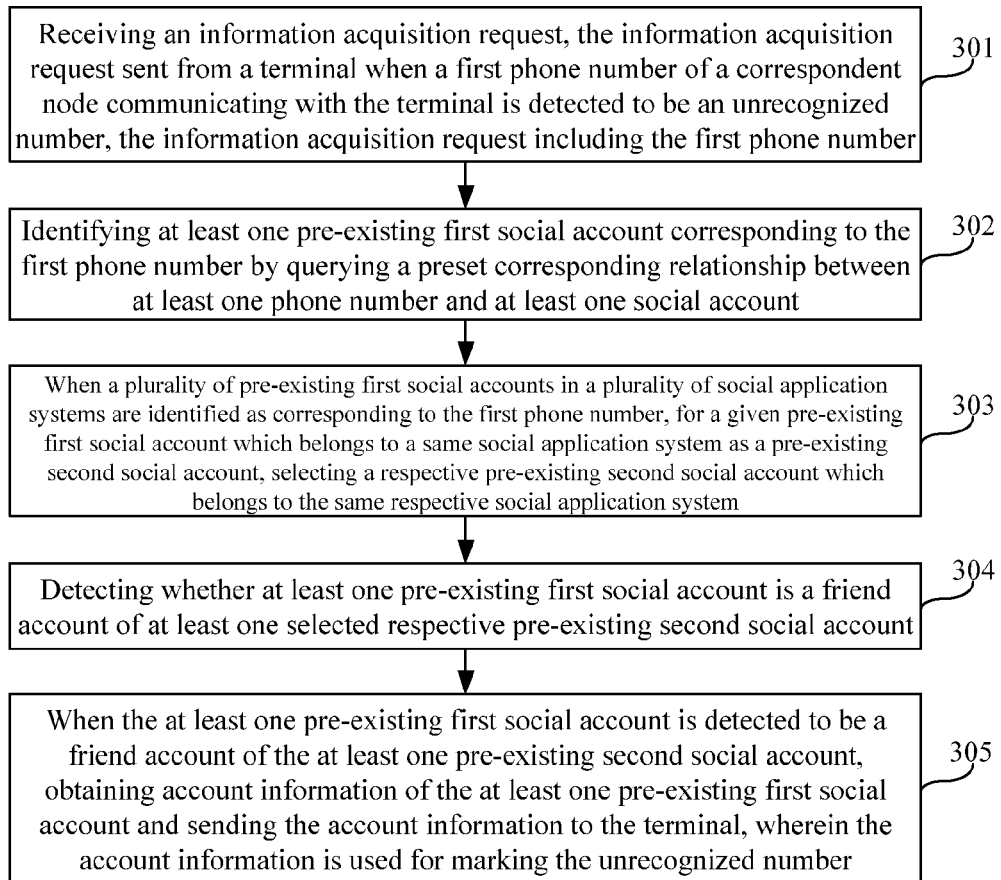
FIG. 3A is a flow chart showing a method for marking an unrecognized number, according to an exemplary embodiment.

FIG. 3A is a flow chart showing a method for marking an unrecognized number, according to an exemplary embodiment. A present exemplary embodiment is illustrated by applying, with a server 130, in the implementation environment shown in FIG. 1, a method for marking an unrecognized number. As shown in FIG. 3A, a method for marking an unrecognized number may include the following steps 301-305. The method for marking an unrecognized number may be implemented as a standalone application, or may be performed in a base layer of a system.

In step 301, an information acquisition request is received, the information acquisition request sent from a terminal when a first phone number of a node communicating with the terminal is detected to be an unrecognized number, the information acquisition request including the first phone number.

The phone number of the correspondent node may at times herein be referred to as a first phone number of the node communicating with the terminal, so as to distinguish it from a phone number of the terminal, but the use of the prefix "first" should not be understood as indicating that the terminal necessarily has more than one phone number.

When the terminal communicates with the correspondent node, the terminal can detect whether the first phone number of the correspondent node is stored in an address book accessible to the terminal. Optionally, the terminal can detect whether the first phone number is stored: in a local address book on the terminal, or in a cloud address book in a cloud computing system, or in both the local address book and the cloud address book. In an embodiment, when the first phone number is detected to not be stored in the local address book or the cloud address book, the first phone number is identified as an unrecognized number. In another embodiment, when the first phone number is detected to not be stored in both the local address book and the cloud address book, the first phone number is identified as an unrecognized number.

When a detection result of the terminal is that the first phone number is not stored in an address book accessible to the terminal, the first phone number is identified as an unrecognized number, and the terminal can in response send to the server the information acquisition request including the first phone number. The server can receive the information acquisition request including the first phone number that was sent by the terminal.

When a detection result of the terminal is that the first phone number is stored in an address book accessible to the terminal, the terminal can mark the first phone number using contact information of the first phone number that is stored in the address book, and a process flow can then end.

In a present embodiment, communication between the terminal and the correspondent node may include communication with the correspondent node initiated by the terminal, or communication which is initiated by the correspondent node and responded to by the terminal. A communication may be a telephone call, or a short message, including a text message such as an SMS short text message.

In step 302, at least one pre-existing first social account corresponding to the first phone number is identified by querying a preset corresponding relationship between at least one phone number and at least one social account.

After receiving the information acquisition request, the server can in response identify a first social account that corresponds to the first phone number included in the information acquisition request, by querying a preset corresponding relationship between one or more stored phone numbers and one or more social accounts.

Optionally, there may be one or a plurality of first social accounts corresponding to the first phone number. When there is a plurality of first social accounts, they may be accounts in a same social application system or accounts in different social application systems. Social application clients corresponding to social accounts in the same social application system share the same social application server. For example, two MiTalk accounts respectively corresponding to two MiTalk clients and sharing a MiTalk server may be two accounts in the same social application system. As another example, MiTalk and MicroBlog use two different respective servers, and thus a MiTalk account and a MicroBlog account may be two accounts in different respective social application systems. A social account may be an application, with components spread across both a terminal and a server.

As an example of two first social accounts that are in different social application systems, the two first social accounts may be MicroBlog and MiTalk accounts, respectively.

Optionally, obtaining the preset corresponding relationship between the phone number and the social account by the server may include the following two implementations.

In a first implementation, the server receives, from each of one or more terminals, a respective corresponding relationship between a respective phone number of a terminal and at least one respective social account associated with a terminal, and stores each received corresponding relationship in the preset corresponding relationship. The one or more terminals may include the correspondent node and the terminal that is communicating with the correspondent node (generally referred to elsewhere in this disclosure as "the terminal").

To establish a corresponding relationship, a user can attach her/his phone number to a social account in a social application, and actively store this attached relationship in the server. The server can store a respective corresponding relationship between a respective phone number and a respective social account which is sent from a respective terminal of each user.

In a second implementation, the server accesses a social server of a social application, obtains, from the social server, a respective corresponding relationship between a respective phone number and a respective social account, and stores the obtained corresponding relationship.

Optionally, when the server has permission to access social servers, the server can also obtain respective corresponding relationships between a phone number and social accounts from each social server, and store the one or more obtained corresponding relationships.

The obtained preset corresponding relationship may thus be a single corresponding relationship between a given phone number (which may be the first phone number of the corresponding node) and a social account, and may be a plurality of respective corresponding relationships between a plurality of phone numbers (which may include the first phone number of the corresponding node) and a plurality of social accounts.

The server can also obtain the preset corresponding relationship in other ways, which are not limited to or by exemplary embodiments.

After obtaining the preset corresponding relationship, the server can identify one or more first social accounts that correspond to the first phone number of the correspondent node by, for example, querying the obtained preset corresponding relationship to search for a respective corresponding relationship between the first phone number of the correspondent node and one or more social accounts, and identifying the one or more social accounts found to be in a corresponding relationship with the first phone number as being the one or more first social accounts.

In step 303, when a plurality of pre-existing first social accounts in a plurality of social application systems are identified as corresponding to the first phone number, a respective pre-existing second social account is selected which belongs to a same respective social application system as does one of the plurality of first social accounts.

A second social account is a social account corresponding to a phone number of the terminal. The phone number of the terminal may at times herein be referred to as a second phone number of the terminal, so as to distinguish it from the phone number of the correspondent node, but the use of the prefix "second" should not be understood as indicating that the terminal necessarily has more than one phone number.

In a manner similar to step 302, the server can identify a second social account corresponding to the second phone number of the terminal, by querying a preset corresponding relationship between one or more phone numbers and one or more social accounts. When there is a plurality of first social accounts identified by the server as corresponding to the first phone number, for each of the plurality of first social accounts, the server can select a respective second social account that belongs to the same social application system as the does the first social account. The selected respective second social account can then be used as a second social account in step 304.

Taking as an example an identified first social account that is a MicroBlog account, the server can in response select a MicroBlog account from one or more second social accounts corresponding to the second phone number.

Step 303 is an optional step. For example, when there is only a single first social account identified to correspond to the first phone number in step 302, the server can omit step 303 and directly proceed to performing step 304.

In step 303, when there is a plurality of second social accounts selected by the server, the server can also, before performing step 304, select, for use as the at least one second social account in step 304, one of the plurality of selected second social accounts, by performing one of the following steps (1), (2), or (3). Step 303 may be performed to eliminate all second social accounts that are a different type from the first social account, so that the types of the first and second accounts are the same. In the example above, where the identified first social account is a MicroBlog account, all second social accounts that are not MicroBlog accounts could be eliminated.

(1) A selected second social account which is most frequently used by the terminal may be selected from the second social accounts.

The more frequently the terminal uses the second social account, the more familiar the user is with account information of each friend account of that second social account in that social application system. Thus the server selecting the second social account which is used most frequently by the terminal for subsequent steps can enable the user to conveniently know, according to the account information, with which friend the user is currently communicating, because terminal will then use account information of the first social account that is identified based on the user's most frequently used account to mark the first phone number, which will likely be easily recognizable to the user, thereby improving the user experience.

(2) A selected second social account which most recently logged onto the terminal may be selected.

Similarly, the server can also select the selected second social account which most recently logged onto the terminal, for use in subsequent steps, so that the account information of the first social account used to mark the first phone number is identified based on the second social account that most recently logged onto the terminal.

(3) A selected second social account in a default social application system may be selected.

The server can also select a selected second social account that is in the default social application system. For example, the server may be configured to, if the selected second social accounts include a MiTalk account among them, select the one that is a MiTalk account by default.

In step 304, whether the at least one pre-existing first social account is a friend account of a selected respective pre-existing second social account is detected.

For each selected second social account, the server can obtain a respective friendship chain, list, or network, corresponding to the second social account, and detect whether the corresponding first social account is a friend account in the obtained friendship chain, list, or network.

Optionally, the server can query the friendship chain, list, or network of the second social account through the social application server corresponding to the first social account. The server can also obtain the friendship chain, list, or network of the second social account from the terminal, but is not limited to or by this exemplary embodiment. In an example, the server can be configured to preferentially query the friendship chain, list, or network of the second social account from the social application server, if the terminal and the server become disconnected during communication of the terminal with the correspondent node.

In step 305, when the at least one pre-existing first social account is detected to be a friend account of the at least one pre-existing second social account, account information of the at least one pre-existing first social account is obtained by the server and sent to the terminal, wherein the account information is used for marking the unrecognized number.

When the detection result of the server is that the first social account is a friend account of the second social account, then the server can in response obtain the account information of the first social account, and send the obtained account information to the terminal. The terminal can receive the account information sent from the server, and mark the unrecognized number using the received account information. As an example, receipt of the account information by the terminal is used for triggering the terminal to use the account information to mark an unrecognized number. The received account information may include a data structure that associates the unrecognized number with a corresponding account nickname and account type. The terminal may then, in response to receiving the received account information, display the unrecognized number along with the corresponding account nickname and account type.

When the detection result of the server is that the first social account is not a friend account of the second social account, then the server can in response end a process flow. The server may also identify a category that the first phone number belongs to, and send the identified category to the terminal, so the terminal can in response mark the first phone number using the received category. An identified category may be unrecognized number, unknown number, stranger, not a friend/connection, etc.

Optionally, the server may obtain the account information of the first social account through the following two implementations.

In a first implementation, note information corresponding to the first social account is obtained from related information corresponding to the second social account. Generally, note information may be information about the first social account that is stored in a manner accessible to the second social account when the first social account is a friend account of the second social account, for example such that the second social account can identify the first social account or aspects of the first social account, communicate with the first social account, etc. Note information includes the phone number associated with the first social account, and may further include a nickname, an icon or avatar, or the like, which is associated with the first social account. Related information may be a set of note information about a plurality of social accounts that are friend accounts of the second social account, the related information stored in a manner accessible to the second account.

Optionally, the server can access the social application server to obtain related information corresponding to the second social account from the social application server, and then obtain the note information corresponding to the first social account from the related information. The related information corresponding to the second social account may include at least the note information. Related information refers to a friend information list of the second social account. Each friend of the second social account who is contained in the friend information list of the second social account should be associated in that list with that friend's respective phone number. For example, where the first social account is a friend of the second social account, the first social account would be listed in the friend information list, in association with the phone number of the first social account. Optionally, the server can send a query request to the social application server, wherein the query request is used for accessing the note information corresponding to the first social account in the second social account. After receiving the query request, the application server queries stored information to access the note information corresponding to the first social account in the second social account, and sends the accessed note information to the server. The server receives the note information corresponding to the first social account sent from the social application server. Optionally, the query request can also request accessing the note information of each friend account of the second social account. Then, after receiving the note information of each friend account returned from the social application server, the server selects the respective note information corresponding to the first social account from among the note information of each of the friend accounts.

Optionally, the server can also send a query request to the terminal, wherein the query request is used for accessing the note information in the second social account that corresponds to the first social account. After receiving the query request, the terminal obtains the note information of the first social account from a social application client that corresponds to the second social account and that is installed on the terminal.

Obtaining the note information may be illustrated by taking as an example a situation where the note information in the second social account that corresponds to the first social account is obtained through the above implementations. Optionally, the server can also obtain the note information using other implementations, and the disclosure is not limited to the exemplary embodiments.

In the second implementation, at least one of an account name, a nickname, or an icon of the first social account is obtained. The account name, nickname, or icon of the first social account may be extracted from the note information.

Figure 3B:
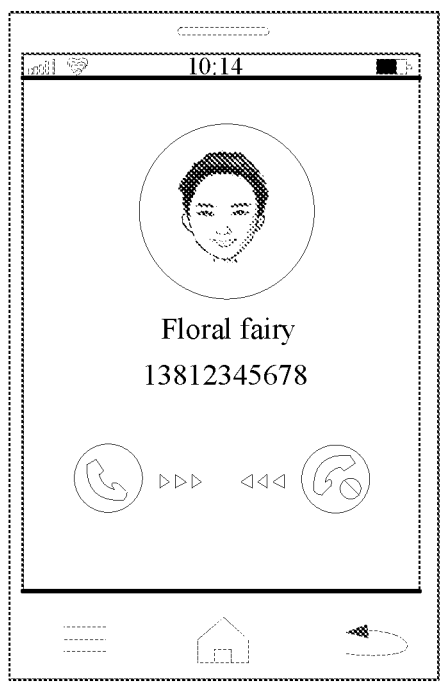
FIG. 3B is a schematic diagram illustrating a terminal marking a first phone number using account information, according to an exemplary embodiment.

Taking as an example a situation where account information of the first social account is the note information in the second social account corresponding to the first social account and an icon of the first social account, after receiving the note information returned from the server, the terminal can use a received icon as an incoming call icon, and use the received note information to mark the first phone number, as shown in FIG. 3B. Marking the first phone number may include displaying on a screen or other display of the terminal, along with the first phone number, various information about the user of the first social account that has been obtained from the account information. Displayed information about the user may include, but is not limited to, a real name of a user of the first social account, a nickname or user name (e.g. "Floral fairy" as shown in FIG. 3B) of the user of the first social account, an avatar of the user of the first account, or any information that could be used by the user of the terminal to gain additional information about who is attempting to communicate. Marking of an unrecognized number may be conducted in real-time while the call is in-coming, so that the user can receive information about the identity of the caller.

In summary, according to a method for marking an unrecognized number according to the present disclosure, when the terminal communicates with a correspondent node whose phone number is an unrecognized number, the first social account corresponding to the first phone number of the correspondent node is identified. When the first social account is detected to be a friend account of the second social account corresponding to the second phone number of the terminal, the account information of the first social account is sent to the terminal, and then the terminal uses the account information to mark the unrecognized number. Thus the present disclosure solves a problem in the related art that when a terminal marks an unrecognized number as being in the category of an unrecognized number, the user will be unable to determine which friend's number the unrecognized number is. The present disclosure achieves the effect that the user can determine which friend the number belongs to through the account information of the first social account that corresponds to the unrecognized number.

Figure 3C:
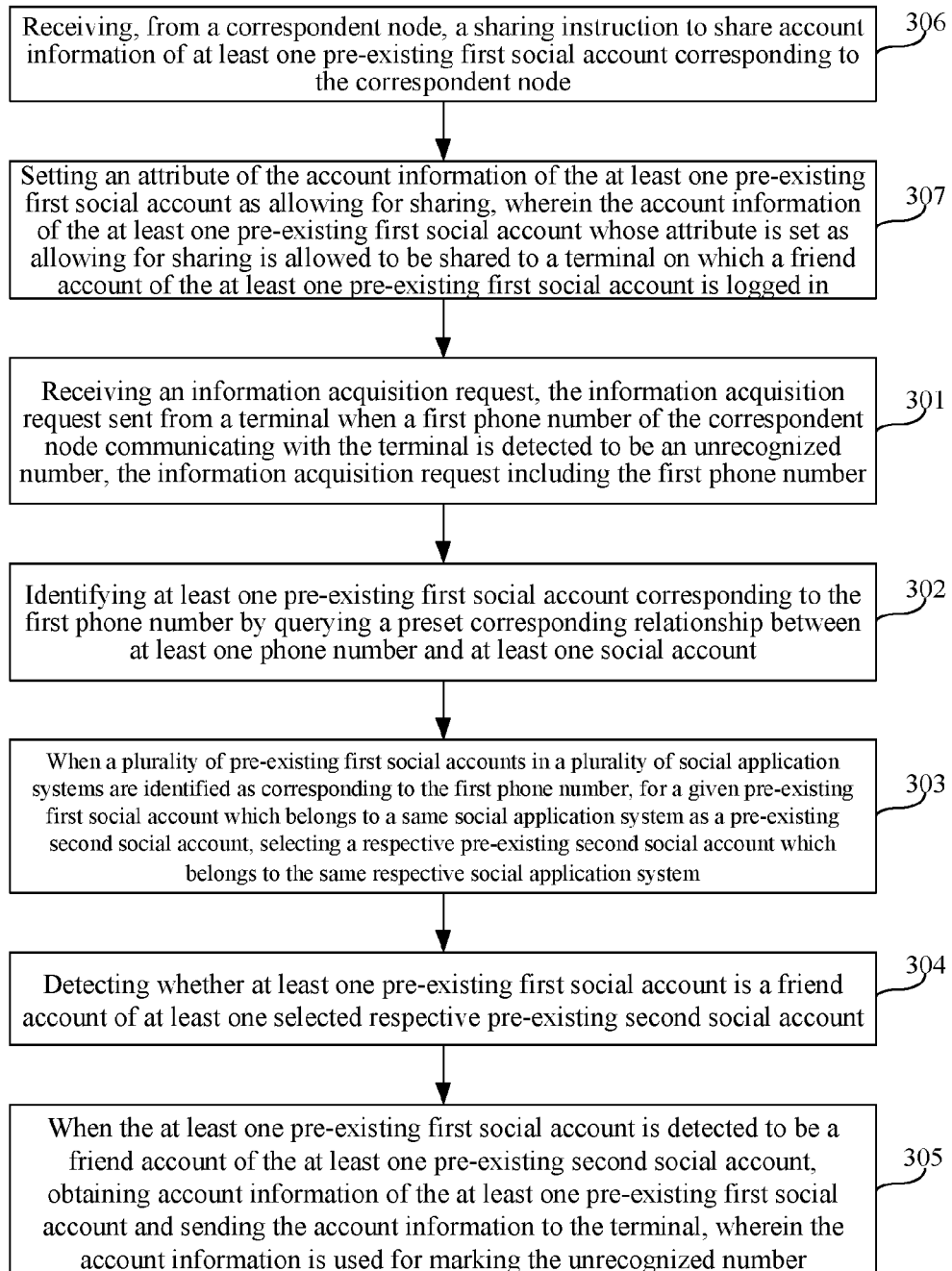
FIG. 3C is a flow chart showing a method for marking an unrecognized number, according to an exemplary embodiment.

Referring to FIG. 3C, a method for marking an unrecognized number, such as the method of FIG. 3A, may further include the following steps 306-307.

In step 306, a sharing instruction to share the account information of the pre-existing first social account is received from the correspondent node.

To ensure the security of the account information of the first social account, the user of the correspondent node can set whether to share the account information of the first social account to terminals on which friend accounts are logged in. The user of the correspondent node can set this using the correspondent node terminal. For example, the user could log open with the correspondent node terminal an application for interfacing with a social system, open a menu in the application, and set whether to share the account information.

Optionally, when the correspondent node sends to the server the sharing instruction to share the account information of the first social account, the server can receive the sharing instruction sent from the correspondent node.

In step 307, an attribute of the account information of the at least one pre-existing first social account is set as allowing for sharing, wherein the account information of the at least one pre-existing first social account whose attribute is set as allowing for sharing is allowed to be shared to a terminal on which a friend account of the at least one first pre-existing social account is logged in.

After receiving the sharing instruction, the server can set the attribute of the account information of the first social account as allowing for sharing. The account information of the first social account whose attribute is set as allowing for sharing is allowed to be shared to the terminal on which a friend account of the first social account is logged in, and the account information of the first social account whose attribute is not set as allowing for sharing is not allowed to be shared to a terminal on which a friend account of the first social account is logged in.

When obtaining the account information of the first social account, the server can also first detect whether the attribute of the account information has been set as allowing for sharing. If the server detects that the attribute of the account information has been set as allowing for sharing, then the server obtains the account information. In one embodiment, if the server detects that the attribute of the account information has not been set as allowing for sharing, the server cannot obtain the account information. In another embodiment, if the server detects that the attribute of the account information is not set as allowing for sharing, the server can obtain the account information, but refuse to send the account information to the terminal. The disclosure is not limited to these exemplary embodiments.

In an embodiment of the disclosure, when, after receiving the sharing instruction, account information of the first social account is set as allowing for sharing, the account information is allowed to be shared to the terminal on which a friend account of the first social account is logged in, and when the account information is not set as allowing for sharing, the account information is not sent to the corresponding terminal. Thus the security of the account information of the first social account may be ensured, the privacy of the user may be ensured, and the user experience may be improved.

The following is a device embodiment according to the present disclosure, which can be used for performing method embodiments according to the present disclosure. Details which are not disclosed in the device embodiment may be found by referring to method embodiments of the present disclosure.

Figure 4:
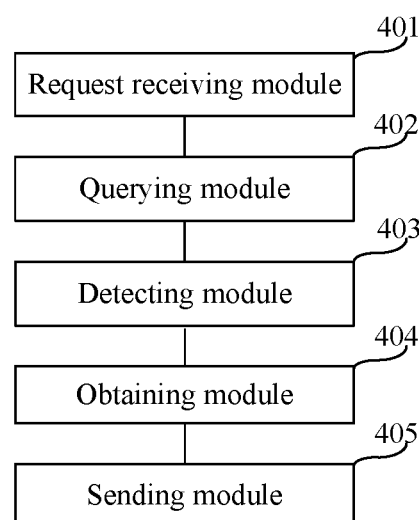
FIG. 4 is a block diagram of a device for marking an unrecognized number, according to an exemplary embodiment.

FIG. 4 is a block diagram of a device for marking an unrecognized number, according to an exemplary embodiment. A present embodiment is illustrated by including an information verification device in or accessible to server 130, or using server 130 as an information verification device, in the implementation environment shown in FIG. 1. As shown in FIG. 4, an information verification device can be a device for marking an unrecognized number, and can include, but is not limited to, a request receiving module 401, a querying module 402, a detecting module 403, an obtaining module 404, and a sending module 405.

The request receiving module 401 is configured to receive an information acquisition request, the information acquisition request sent from a terminal when a first phone number of a correspondent node communicating with the terminal is detected to be an unrecognized number, the information acquisition request including the first phone number.

The querying module 402 is configured identify at least one first social account corresponding to the first phone number by querying a preset corresponding relationship between at least one phone number and at least one social account.

The detecting module 403 is configured to detect whether the at least one first social account which is identified by the querying module 402 is a friend account of at least one second social account corresponding to a second phone number of the terminal.

The obtaining module 404 is configured to, when the at least one first social account is detected by detecting module 403 to be a friend account of the at least one second social account, obtain account information of the at least one first social account.

The sending module 405 is configured send the account information obtained by obtaining module 404 to the terminal, wherein the account information is to be used for marking the unrecognized number.

In summary, according to a device for marking an unrecognized number according to the present disclosure, when the terminal communicates with a correspondent node whose phone number is an unrecognized number, the first social account corresponding to the first phone number of the correspondent node is identified by a querying module. When the first social account is detected by a detecting module to be a friend account of the second social account corresponding to the second phone number of the terminal, the account information of the first social account is sent to the terminal by a sending module, and then the terminal uses the account information to mark the unrecognized number. Thus the present disclosure may solve a problem in the related art that when a terminal marks an unrecognized number as being in the category of an unrecognized number, the user will be unable to determine which friend's number the unrecognized number is. The present disclosure may achieve the effect that the user can determine which friend the number belongs to through the account information of the first social account that corresponds to the unrecognized number.

Figure 5:
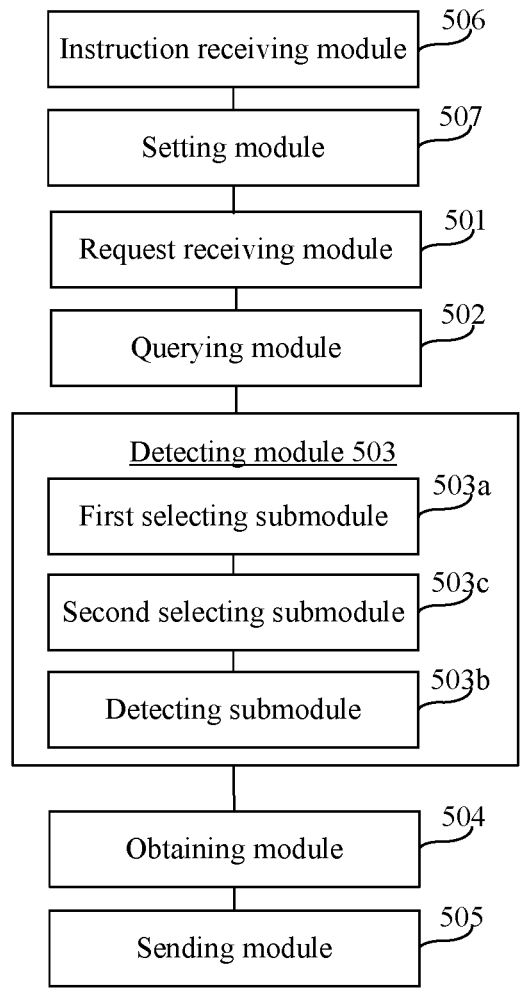
FIG. 5 is a block diagram of a device for marking an unrecognized number, according to another exemplary embodiment.

FIG. 5 is a block diagram of a device for marking an unrecognized number, according to an exemplary embodiment. The present embodiment is illustrated by including an information verification device in or accessible to server 130, or using server 130 as an information verification device, in the implementation environment shown in FIG. 1. As shown in FIG. 5, an information verification device can be a device for marking an unrecognized number, and can include, but is not limited to, a request receiving module 501, a querying module 502, a detecting module 503, an obtaining module 504, and a sending module 505.

The request receiving module 501 is configured to receive an information acquisition request, the information acquisition request sent from a terminal when a first phone number of a correspondent node communicating with the terminal is detected to be an unrecognized number, the information acquisition request including the first phone number.

The querying module 502 is configured to identify at least one first social account corresponding to the first phone number by querying a preset corresponding relationship between at least one phone number and at least one social account.

The detecting module 503 is configured to detect whether the at least one first social account identified by querying module 502 is a friend account of at least one second social account corresponding to a second phone number of the terminal.

The obtaining module 504 is configured to, when the at least one first social account is detected by detecting module 503 to be a friend account of the at least one second social account, obtain account information of the at least one first social account.

The sending module 505 is configured to send, with a server, the account information obtained by obtaining module 504 to the terminal, wherein the account information is to be used for marking the unrecognized number.

Optionally, the detecting module 503 includes a first selecting submodule 503a, which is configured to, when plurality of first social accounts in a plurality of social application systems are identified as corresponding to the first phone number, for a given first social account which belongs to a same social application system as a second social account, select a respective second social account which belongs to the same respective social application system.

Optionally, the detecting module 503 further includes a detecting submodule 503b, which is configured to detect whether the first social account is a friend account of the selected respective second social account selected by first selecting submodule 503a.

Optionally, the detecting module 503 further includes a second selecting submodule 503c, which is configured to, when a plurality of respective second social accounts are selected by the first selecting submodule 503a, before detecting submodule 503 detects whether a first social account is a friend account of a selected respective second social account: select one of the plurality of selected respective second social accounts which is most frequently used by the terminal; or select one of the plurality of selected respective second social accounts which most recently logged onto the terminal; or select one of the plurality of selected respective second social accounts which is in a default social application system.

Optionally, the obtaining module 504 is further configured to obtain note information corresponding to the at least one first social account from related information corresponding to the second social account. Optionally, the obtaining module 504 is configured to additionally or alternatively obtain at least one of an account name, a nickname, or an icon of the at least one first social account.

Optionally, the device further includes an instruction receiving module 506, which is configured receive, from the correspondent node, a sharing instruction to share the account information of the at least one first social account. Optionally, the device further includes a setting module 507, which is configured set an attribute of the account information of the at least one first social account as allowing for sharing, wherein the account information of the at least one first social account whose attribute is set as allowing for sharing is allowed to be shared to a terminal on which a friend account of the at least one first social account is logged in.

In summary, according to a device for marking an unrecognized number according to the present disclosure, when the terminal communicates with a correspondent node whose phone number is an unrecognized number, the first social account corresponding to the first phone number of the correspondent node is identified by a querying module. When the first social account is detected by a detecting module to be a friend account of the second social account corresponding to the second phone number of the terminal, the account information of the first social account is sent to the terminal by a sending module, and then the terminal uses the account information to mark the unrecognized number. Thus the present disclosure may solve a problem in the related art that when a terminal marks an unrecognized number as being in the category of an unrecognized number, the user will be unable to determine which friend's number the unrecognized number is. The present disclosure may achieve the effect that the user can determine which friend the number belongs to through the account information of the first social account that corresponds to the unrecognized number.

In an embodiment of the disclosure, when, after receiving the sharing instruction from an instruction sharing module, account information of the first social account is set by a setting module as allowing for sharing, the account information is allowed to be shared by the sending module to the terminal on which a friend account of the first social account is logged in, and when the account information is not set by the setting module as allowing for sharing, the account information is not sent by the sending module to the corresponding terminal. Thus the security of the account information of the first social account may be ensured, the privacy of the user may be ensured, and the user experience may be improved.

With respect to the devices in the above embodiments, the specific manners for performing operations of individual modules therein have been described in detail in the description of embodiments of the methods, and will not be elaborated further herein.

Figure 6:
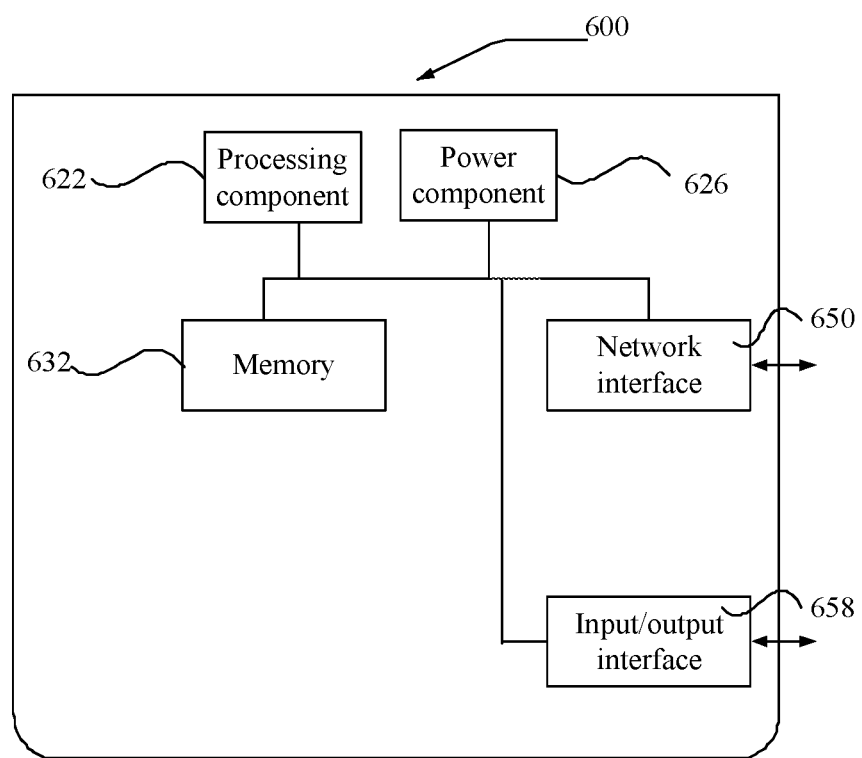
FIG. 6 is a block diagram of a device for marking an unrecognized number, according to an exemplary embodiment.

FIG. 6 is a block diagram of a device 600 for marking an unrecognized number, according to an exemplary embodiment. For example, the device 600 may be provided as a server, and may be an embodiment of server 130. Referring to FIG. 6, the device 600 includes a processing component 622 including one or more processors, and a memory resource represented by a memory 632 and configured to store instructions capable of being executed by the processing component 622, e.g., application programs. The application programs stored in the memory 632 may include one or more than one module corresponding to a set of instructions. The one or more than one module stored in memory 632 and corresponding to a set of instructions may include request receiving module 401, querying module 402, detecting module 403, obtaining module 404, sending module 405, instruction receiving module 506, setting module 507, request receiving module 501, querying module 502, detecting module 503, first selecting submodule 503a, second selecting submodule 503c, detecting submodule 503b, obtaining module 504, or sending module 505. In addition, the processing component 622 is configured to execute instructions to perform the method for marking an unrecognized number. For example, processing component 622 may be configured to execute the instructions stored as modules in memory 632.

Each module discussed above, such as request receiving module 401, querying module 402, detecting module 403, obtaining module 404, sending module 405, instruction receiving module 506, setting module 507, request receiving module 501, querying module 502, detecting module 503, first selecting submodule 503a, second selecting submodule 503c, detecting submodule 503b, obtaining module 504, or sending module 505 may take the form of a packaged functional hardware unit designed for use with other components, a portion of a program code (e.g., software or firmware) executable by the one or more processors of processing component 622 or the processing circuitry that usually performs a particular function of related functions, or a self-contained hardware or software component that interfaces with a larger system, for example.

The device 600 may also include a power component 626 which is configured to perform power management of the device 600, a wired or wireless network interface 650 which is configured to connect the device 600 to a network, and an Input/Output (I/O) interface 658. Operating systems which are stored in the memory 632, such as Windows Server™, Mac OS X™, Unix™, Linux™, and FreeBSD™, can be run in the device 600.

The methods, devices, and modules described above may be implemented in many different ways and as hardware, software or in different combinations of hardware and software. For example, all or parts of the implementations may be a processing circuitry that includes an instruction processor, such as a central processing unit (CPU), microcontroller, a microprocessor; or application specific integrated circuits (ASICs), digital signal processors (DSPs), digital signal processing devices (DSPDs), programmable logic devices (PLDs), field programmable gate arrays (FP- GAs), controllers, micro-controllers, microprocessors, other electronic components; or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

It will be appreciated that the present disclosure is not limited to the exact constructions that have been described above and illustrated in the accompanying drawings, and that various modifications and changes can be made without departing from the scope thereof. It is intended that the scope of the disclosure only be limited by the appended claims.

INDUSTRIAL APPLICABILITY

The present disclosure may solve a problem in related art that when a terminal, such as a mobile phone, marks an unrecognized number as being in the category of an unrecognized number, the user will be unable to determine which friend's number the unrecognized number is. The present disclosure may achieve the effect that the user can determine which friend the number belongs to through the account information of the first social account that corresponds to the unrecognized number.

What is claimed is:

1. A method for marking an unrecognized phone number, comprising:
    receiving, with a server, an information acquisition request sent from a terminal when a first phone number of a correspondent node communicating with the terminal is detected to be an unrecognized number, the information acquisition request including the first phone number;
    identifying, with a server, at least one pre-existing first social account corresponding to the first phone number by querying a preset corresponding relationship between at least one phone number and at least one social account;
    detecting, with a server, whether the at least one pre-existing first social account is a friend account of at least one pre-existing second social account corresponding to a second phone number of the terminal; and
    when the at least one pre-existing first social account is detected to be a friend account of the at least one pre-existing second social account:
        obtaining, with a server, account information of the at least one pre-existing first social account, and
        sending, with a server, the account information to the terminal, wherein the account information is used for marking the unrecognized number.

2. The method of claim 1, wherein when a plurality of pre-existing first social accounts in a plurality of social application systems are identified as corresponding to the first phone number, detecting whether the at least one pre-existing first social account is a friend account of the at least one pre-existing second social account comprises:
    for a given pre-existing first social account which belongs to a same social application system as a pre-existing second social account:
        selecting a respective pre-existing second social account which belongs to the same respective social application system, and
        detecting whether the pre-existing first social account is a friend account of the selected respective pre-existing second social account.

3. The method of claim 2, further comprising:
    when a plurality of respective pre-existing second social accounts are selected, before detecting whether a pre-existing first social account is a friend account of a selected respective pre-existing second social account:
        selecting one of the plurality of selected respective pre-existing second social accounts which is most frequently used by the terminal;
        selecting one of the plurality of selected respective pre-existing second social accounts which most recently logged onto the terminal; or
        selecting one of the plurality of selected respective pre-existing second social accounts which is in a default social application system.

4. The method of claim 1, wherein obtaining the account information of the at least one pre-existing first social account comprises at least one of:
    obtaining note information corresponding to the at least one pre-existing first social account from related information corresponding to the at least one pre-existing second social account; or
    obtaining at least one of an account name, a nickname, or an icon of the at least one pre-existing first social account.

5. The method of claim 1, further comprising:
    receiving, from the correspondent node, a sharing instruction to share the account information of the at least one pre-existing first social account; and
    setting an attribute of the account information of the at least one pre-existing first social account as allowing for sharing, wherein the account information of the at least one pre-existing first social account whose attribute is set as allowing for sharing is allowed to be shared to a terminal on which a friend account of the at least one pre-existing first social account is logged in.

6. A device for marking an unrecognized phone number, comprising:
    a processor; and
    a memory configured to store processor executable instructions;
    wherein, the processor is configured to:
        receive, with a server, an information acquisition request sent from a terminal when a first phone number of a correspondent node communicating with the terminal is detected to be an unrecognized number, the information acquisition request including the first phone number;
        identify, with a server, at least one pre-existing first social account corresponding to the first phone number by querying a preset corresponding relationship between at least one phone number and at least one social account;
        detect, with a server, whether the at least one pre-existing first social account is a friend account of at least one pre-existing second social account corresponding to a second phone number of the terminal; and
        when the at least one pre-existing first social account is detected to be a friend account of the at least one pre-existing second social account:

obtain, with a server, account information of the at least one pre-existing first social account, and send, with a server, the account information to the terminal, wherein the account information is to be used for marking the unrecognized number.

7. The device of claim 6, wherein the processor is configured to, when a plurality of pre-existing first social accounts in a plurality of social application systems are identified as corresponding to the first phone number:

for a given pre-existing first social account which belongs to a same social application system as a pre-existing second social account:

select a respective pre-existing second social account which belongs to the same respective social application system, and detect whether the pre-existing first social account is a friend account of the selected respective pre-existing second social account.

8. The device of claim 7, wherein the processor is configured to, when a plurality of respective pre-existing second social accounts are selected, before detecting whether a pre-existing first social account is a friend account of a selected respective pre-existing second social account:

select one of the plurality of selected respective pre-existing second social accounts which is most frequently used by the terminal;

select one of the plurality of selected respective pre-existing second social accounts which most recently logged onto the terminal; or select one of the plurality of selected respective pre-existing second social accounts which is in a default social application system.

9. The device of claim 6, wherein the processor is configured to:

obtain note information corresponding to the at least one pre-existing first social account from related information corresponding to the at least one pre-existing second social account; or obtain at least one of an account name, a nickname, or an icon of the at least one pre-existing first social account.

10. The device of claim 6, wherein the processor is further configured to:

receive, from the correspondent node, a sharing instruction to share the account information of the at least one pre-existing first social account; and set an attribute of the account information of the at least one pre-existing first social account as allowing for sharing, wherein the account information of the at least one pre-existing first social account whose attribute is set as allowing for sharing is allowed to be shared to a terminal on which a friend account of the at least one pre-existing first social account is logged in.

11. A non-transitory computer-readable storage medium having stored therein instructions for marking an unrecognized phone number, the instructions configured to, when executed by a processor of a mobile terminal, cause the server to:

receive an information acquisition request sent from a terminal when a first phone number of a correspondent node communicating with the terminal is detected to be an unrecognized number, the information acquisition request including the first phone number;

identify at least one pre-existing first social account corresponding to the first phone number by querying a preset corresponding relationship between at least one phone number and at least one social account;

detect whether the at least one pre-existing first social account is a friend account of at least one pre-existing second social account corresponding to a second phone number of the terminal; and when the at least one pre-existing first social account is detected to be a friend account of the at least one pre-existing second social account:

obtain account information of the at least one pre-existing first social account, and send the account information to the terminal, wherein the account information is to be used for marking the unrecognized number.

12. The non-transitory computer-readable storage medium of claim 11, wherein the instructions are further configured to cause the server to, when a plurality of pre-existing first social accounts in a plurality of social application systems are identified as corresponding to the first phone number:

for a given pre-existing first social account which belongs to a same social application system as a pre-existing second social account:

select a respective pre-existing second social account which belongs to the same respective social application system, and detect whether the pre-existing first social account is a friend account of the selected respective pre-existing second social account.

13. The non-transitory computer-readable storage medium of claim 12, wherein the instructions are further configured to cause the server to, when a plurality of respective pre-existing second social accounts are selected, before detecting whether a pre-existing first social account is a friend account of a selected respective pre-existing second social account:

select one of the plurality of selected respective pre-existing second social accounts which is most frequently used by the terminal;

select one of the plurality of selected respective pre-existing second social accounts which most recently logged onto the terminal; or select one of the plurality of selected respective pre-existing second social accounts which is in a default social application system.

14. The non-transitory computer-readable storage medium of claim 11, wherein the instructions are further configured to cause the server to:

obtain note information corresponding to the at least one pre-existing first social account from related information corresponding to the at least one pre-existing second social account; or obtain at least one of an account name, a nickname, or an icon of the at least one pre-existing first social account.

15. The non-transitory computer-readable storage medium of claim 11, wherein the instructions are further configured to cause the server to:

receive, from the correspondent node, a sharing instruction to share the account information of the at least one pre-existing first social account; and set an attribute of the account information of the at least one pre-existing first social account as allowing for sharing, wherein the account information of the at least one pre-existing first social account whose attribute is set as allowing for sharing is allowed to be shared to a terminal on which a friend account of the at least one pre-existing first social account is logged in.

* * * * *